United States Patent
Yu et al.

(10) Patent No.: US 7,460,449 B2
(45) Date of Patent: Dec. 2, 2008

(54) RECORDABLE OPTICAL RECORDING MEDIUM CONTAINING PREINSTALLED INFORMATION, THE METHOD OF READING THE SAME, AND THE CIRCUIT THEREOF

(75) Inventors: Chih-Ching Yu, Hsinchu (TW); Nai-Heng Tseng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 100 days.

(21) Appl. No.: 10/853,156

(22) Filed: May 26, 2004

(65) Prior Publication Data

US 2005/0141403 A1 Jun. 30, 2005

(30) Foreign Application Priority Data

Dec. 26, 2003 (TW) .............................. 92137219 A

(51) Int. Cl.
*G11B 7/00* (2006.01)
(52) U.S. Cl. ................ 369/47.1; 369/124.07; 369/47.27
(58) Field of Classification Search ................ 369/47.1, 369/47.27, 47.28, 275.3, 44.26, 44.13, 124.01, 369/124.07
See application file for complete search history.

(56) References Cited

U.S. PATENT DOCUMENTS 6,741,546 B2 * 5/2004 Watabe et al. ............ 369/275.3

* cited by examiner

*Primary Examiner*—Nabil Z Hindi
(74) *Attorney, Agent, or Firm*—Birch, Stewart, Kolasch & Birch, LLP

(57) ABSTRACT

This specification discloses a recordable optical recording medium containing preinstalled information, the method of reading the preinstalled information, and the circuit thereof. The recordable optical recording medium containing preinstalled information is a substrate with a spiral pregroove. Microscopically, the pregroove has regular wiggles. They are featured in containing a first waveform, a second waveform, and a third waveform with the same fundamental wave cycle. The duty cycle of the first waveform is 1. The duty cycles of the second and third waveforms are distinct. The combinations of these duty cycles are used to record the preinstalled information. Moreover, the invention discloses a method and circuit of reading the preinstalled information. After obtaining the wobble signals, the method further takes the steps of phase corrections, integrations, and resetting to more accurately obtain the preinstalled information.

6 Claims, 3 Drawing Sheets

RECORDABLE OPTICAL RECORDING MEDIUM CONTAINING PREINSTALLED INFORMATION, THE METHOD OF READING THE SAME, AND THE CIRCUIT THEREOF

This Non-provisional application claims priority under 35 U.S.C. § 119(a) on Patent Application No(s). 092137219 filed in Taiwan on Dec. 26, 2003, the entire contents of which are hereby incorporated by reference.

BACKGROUND OF THE INVENTION

1. Field of Invention

The invention relates to a recordable optical recording medium and the reading mechanism thereof. In particular, the invention relates to a recordable optical recording medium containing preinstalled information, the method of reading the preinstalled information, and the circuit thereof.

2. Related Art

In order for an optical disc drive to identify the address and parameters of a blank recordable optical disc, the optical disc manufacturer has to preinstall some information on the blank disc. Such information includes the manufacturer identification (ID) code, a recommended optical writing power, initial and terminal addresses of the recordable region, and actual addresses of various important sectors. If the information is preinstalled (or pre-recorded) on the land of data tracks, a simple circuit can be used directly detect the data. However, such data occupy certain recordable space. Therefore, a common solution is to preinstall the information in the servo signal. However, this requires one to add a corresponding detection circuit in the servo channel. The latency of decoding is not good for rapid random access.

Take the information preinstallation of a CD-R/RW disc as an example. The information is recorded in the wobble groove by frequency modulation (FM). The wobble is a sine wave of 23.05 KHz or 21.05 KHz. The 23.05 KHz high frequency means "1" while the 21.05 KHz low frequency means "0." At standard rotation speeds, the carried information is 42 bit*75 Hz. The detection method requires the use of a bipolar phase-lock circuit.

The DVD+RW disc adopts another mechanism to preinstall information. The information is stored in the wobble groove by phase modulation (PM). The wobble is an 817.5 KHz monotonic sine wave. The cycle with an initial phase equal to 0 degree means "0." The cycle with an initial phase equal to 180 degrees means "1." The detection of the preinstalled information requires the use of high-speed analog-to-digital (A/D) integrated circuit (IC) chip and a phase-lock circuit.

The pregroove of the DVD-R/RW disc also has wiggles, which is a 140.6 KHz sine wave. However, this wobble groove is used to record the preinstalled information, but only for rotation speed control. The actual recording location of the preinstalled information is in the so-called "prepit." Its detection only requires a comparator and a filter. The above-mentioned three types of preinstalled information and their reading mechanisms are hidden in the servo signal. For the DVD disc, the preinstalled information is etched in the read-only region in the beginning of each sector. The disc drive can directly detect such information from the data signal. However, how to reduce the complexity of reaching circuit and to make it suitable for rapid random access is still an important direction in the development of preinstalled information mechanisms for optical discs.

SUMMARY OF THE INVENTION

An objective of the invention is to provide a recordable optical recording medium containing preinstalled information, a reading method for the preinstalled information, and the circuit thereof.

The preinstalled information in the disclosed optical recording medium is hidden in the servo signal. It is not recorded in the wobble groove by simple PM or FM means. According to the invention, the duty cycle in a sine wave with a fixed frequency is varied to represent logic "0" and "1." Therefore, the disclosed information preinstallation method is called the phase ratio modulation (PRM).

According to the above concept, the disclosed recordable optical recording medium is made of a substrate with a spiral pregroove. The groove is the region for users to record. Microscopically, the grooves have regular wiggles. The phase variation within the wiggle cycle can be detected from a tracking servo signal for storing the preinstalled information.

To achieve the above objective, the invention discloses a recordable optical recording medium containing preinstalled information. It comprises a substrate and a recording layer thereon. The substrate surface is etched with a spiral pregroove for providing a tracking servo signal. The track of the pregroove is a slightly wobbled spiral curve. The wobble consist a first waveform, a second waveform, and a third waveform with the same fundamental wave cycle. The former half cycle and the latter half cycle of the first waveform is the same. Their ratio, called the duty cycle, is 1. The duty cycles of the second and third waveforms are different. Using the property that the duty cycles of the waveforms are all different, the second waveform and the third waveform represent logic "0" and "1," respectively. The preinstalled information of the optical recording medium is recorded in the wobbles in terms of the combinations of the above-mentioned 0's and 1's. The cycle of each waveform represents one bit of the preinstalled information. The first, second, and third waveforms can all be sine waves or cosine waves.

For the above-mentioned recordable optical recording medium, the invention also discloses a method for reading the preinstalled information from the recordable optical recording medium. First, a wobble signal is extracted from a tracking servo signal, filtering out signals in the non-wobble band. According to the wobble signal, a clock generating signal is generated as the standard for generating a writing clock. The clock generating signal is phase-shifted by 90 degrees to produce a phase correction signal. The wobble signal is integrated and reset according to the upper and lower edges of the phase correction signal, outputting an integrated and reset wobble signal. The integrated and reset wobble signal is then divided to generate the preinstalled information.

In accord with the disclosed method for reading the preinstalled information, the invention further discloses a circuit for reading the preinstalled information on a recordable optical recording medium. The circuit includes a band-pass filter, which receives a tracking servo signal and outputs a wobble signal by filtering out signals in the non-wobble band; a phase-lock loop, which outputs a clock generating signal according to the wobble signal as the standard for generating a writing clock; a phase corrector, which obtains the clock generating signal and performs a 90-degree phase shift to produce a phase corrected signal; an integration and reset circuit, which integrates the wobble signal and resets it according to the upper and lower edges of the phase corrected signal, outputting an integrated and reset wobble signal; and a division circuit, which divides the integrated and reset wobble signal into the preinstalled information for a decoder. The preinstalled information includes disc information and addressing codes (DIAC).

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

A normal recordable optical recording medium containing preinstalled information, such as a compact disc, includes the structure of a protection layer, a reflection layer, a recording layer, and a substrate. The protection layer protects the reflecting layer from being oxidized or scratched and functions as the base of printing. The reflection layer reflects laser beams. The substrate supports all the above-mentioned layers. The recording layer allows a user to write in data using a laser pickup head. Before the disc is used (i.e. the disc is a blank), the material on the recording layer is homogenous. However, the substrate is not completely flat. It is etched with a pregroove spiraling out from the center. The function of the pregroove is provided for the servo system to perform blank disc tracking. The data are stored in the pregroove to form a groove track.

Figure 1:
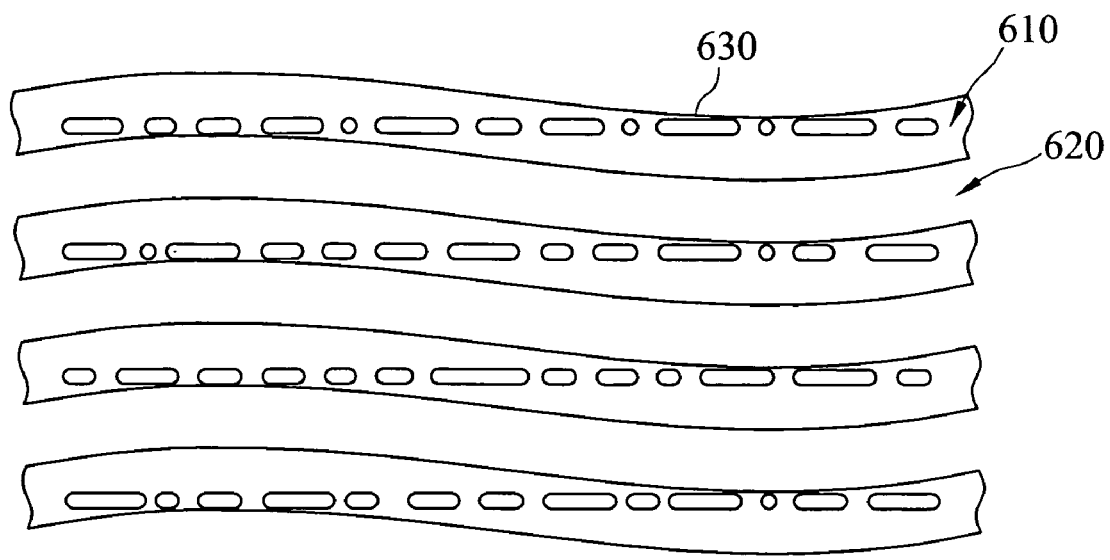
FIG. 1 is a schematic view of the structure of a recordable optical recording medium that contains preinstalled information according to the invention.

With reference to FIG. 1, the substrate surface of the disclosed optical recording medium contains interleaving grooves 510 and lands 520. The spiral groove is not a perfect spiral, but contains slight wobbles 530 for recording the preinstalled information. An optical disc drive accesses data, the wobble signal from the wobbles 530 is carried on the tracking servo signal. Since the frequency of the wobble signal is much higher than the detectable range of the tracking servo system, one can readily extract the wobble signal from the tracking servo signal. Therefore, the wobble can be used to carry the preinstalled information.

Figures 2A, 2B:
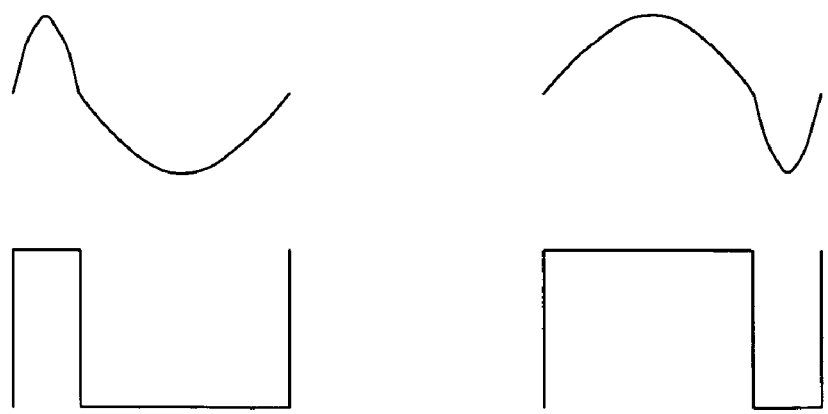
FIGS. 2A and 2B are schematic views of the disclosed preinstalled information presentation method.

The wobbles contain a first waveform, a second waveform, and a third waveform with the same fundamental wave cycle. The former half cycle and the latter half cycle of the first waveform is the same; thus, its duty cycle is 1. The second and third waveforms have distinct duty cycles and are used to represent logic "0" and "1." The preinstalled information can be recorded in the wobbles in terms of the logic "0" and "1." The cycle of each waveform represents one bit of preinstalled information. Take a sine wave as an example. With reference to FIGS. 2A and 2B, the fundamental cycle of each sine wave contained in the wobbles is the same, representing one bit of preinstalled information. However, the duty cycles are different. The second waveform shown in FIG. 2A has a duty cycle smaller than 1. We define the one with a shorter first half cycle (phase from 0 to 180 degrees) as an early wobble (EW). The third waveform shown in FIG. 2B has a duty cycle bigger than 1. We define the one with a shorter second half cycle (phase from 180 to 360 degrees) as a late wobble (LW). If we use EW for "0" and LW for "1," the pregroove is then any combination of the EW's and LW's. In order to conveniently analyze the difference in each waveform and the information it represents, one of the second and third waveforms is set to have a duty cycle greater than 1. On the other hand, the other is set to have a duty cycle smaller than one.

The invention provides a method for reading the preinstalled information for retrieving the information stored in the wobbles of the pregroove.

Figure 3:
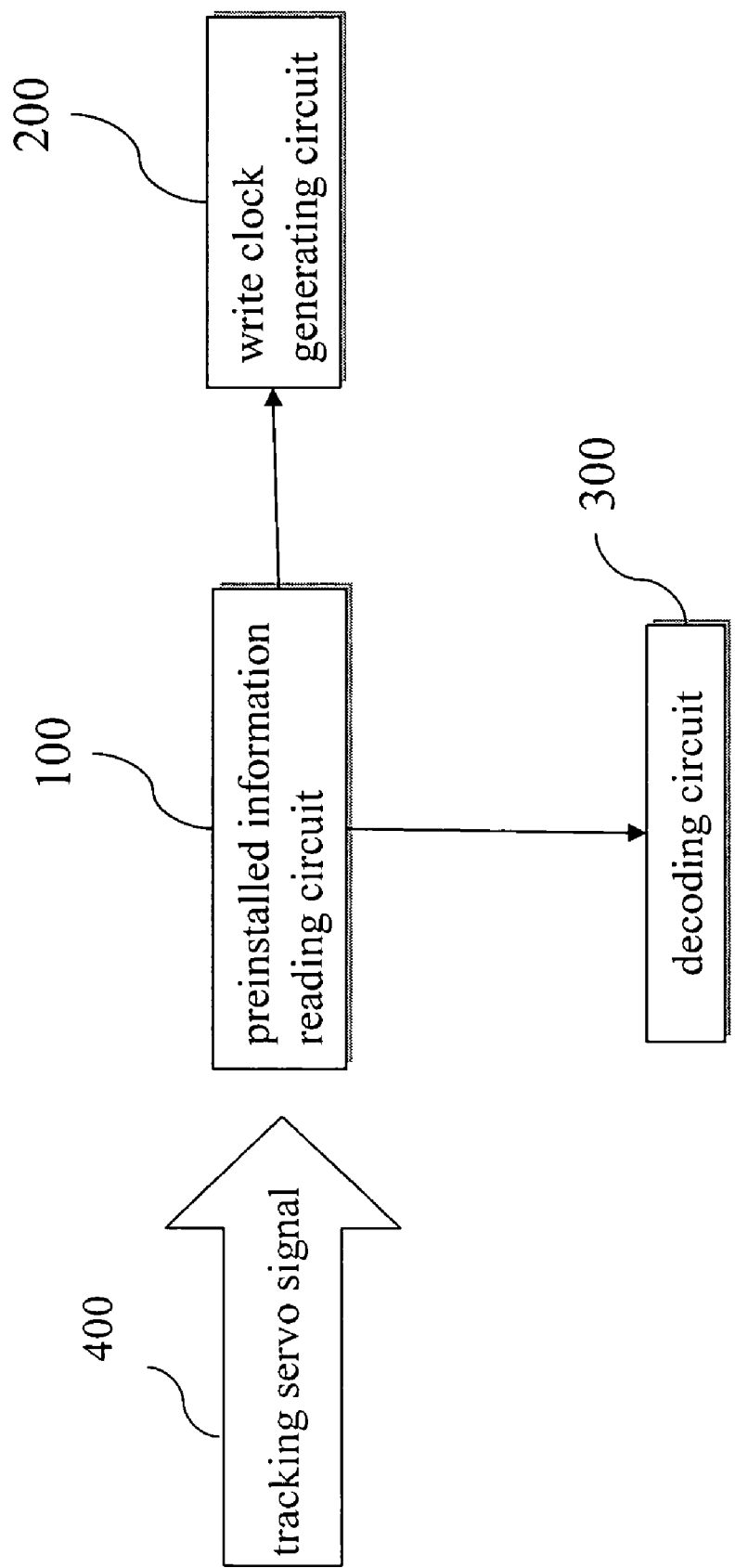
FIG. 3 is a block diagram of the circuit for extracting the preinstalled information.

With reference to FIG. 3, the circuit for obtaining the preinstalled information includes a preinstalled information reading circuit 100, a write clock generating circuit 200, and a DIAC (disk information and addressing code) decoding circuit 300. The preinstalled information reading circuit 100 receives a tracking servo signal 400. It further outputs a clock generating signal to the write clock generating circuit 200 and a processed wobble signal to the DIAC decoding circuit 300.

When an optical disk drive accesses the disclosed recordable optical recording medium containing preinstalled information, the preinstalled information recorded in the spiral pregroove form the wobble signal in the combination of EW's and LW's. The wobble signal is carried by the tracking servo signal 400.

The preinstalled information reading circuit 100 outputs the clock generating signal to the write clock generating circuit 200 for generating a write clock. The write clock is the fundamental clock for writing data. When the optical disc drive rotates the optical disk, the rotational speed is not kept constant at all times. There are always some errors. This change the frequencies of the wobble signal. To avoid the situations of unable to write data or having writing mistakes due to the errors in speed and frequency, the frequency for writing data has to be held fixed. This frequency is related to the frequency of the wobble signal.

In addition to outputting the clock generating signal, the preinstalled information reading circuit 100 also outputs the preinstalled information signal to the DIAC decoding circuit. The wobble signal, having three basic waveforms, is an analog signal. The preinstalled information signal obtained from the wobble signal is a digital signal that is comprised of a series of logic 0's and 1's as far as the system is concerned. Therefore, the preinstalled information signal output by the preinstalled information reading circuit 100 is sent to the DIAC decoding circuit 300 for extracting the preinstalled information recording in the pregroove.

Figure 4:
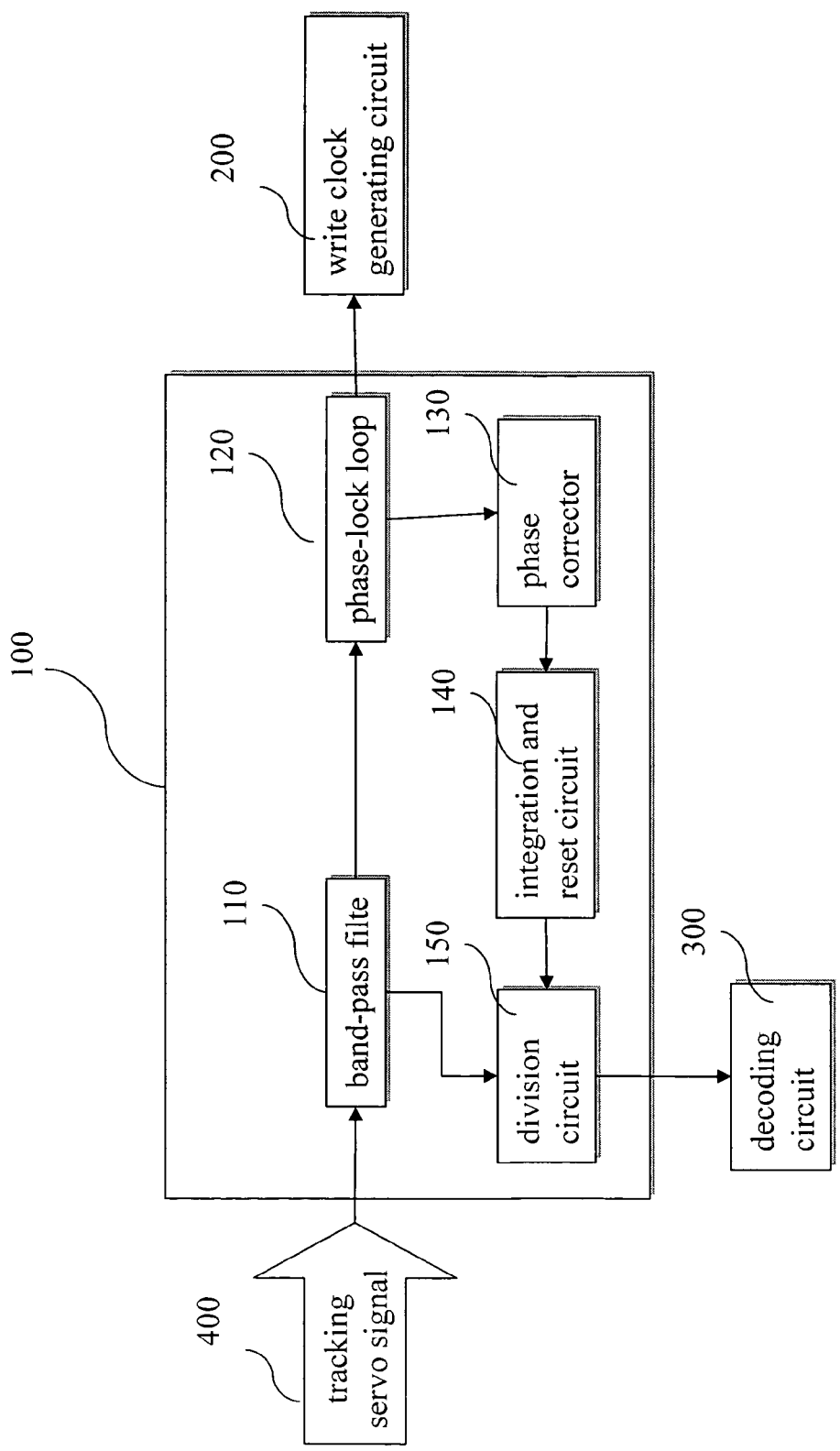
FIG. 4 is a circuit block diagram of the preinstalled information reading circuit.

How to more accurately extract the preinstalled information is determined by the preinstalled information reading circuit. As shown in FIG. 4, the preinstalled information reading circuit contains a band-pass filter 110, a phase-lock loop 120, a phase corrector 130, an integration and reset circuit 140, and a division circuit 150.

The band-pass filter 110 receives the tracking servo signal 400 and outputs the wobble signal to the phase-lock loop. Since the frequencies of the wobble signal and the tracking servo signal 400 are different, we use the band-pass property of the band-pass filter to remove signals in the non-wobble bands, extracting exclusively the wobble signal. The phase-lock loop 120 follows the wobble signal to output a clock generating signal to the write clock generating circuit 200. At the same time, the phase corrector 130 receives the clock generating signal and makes a 90-degree phase shift, producing a phase corrected signal. The integration and reset circuit 140 is employed to integrate the wobble signal and performs resets according to the rising edge and the lowering edge of the phase corrected signal, outputting an integrated and reset wobble signal. The division circuit 150 cuts the integrated and reset signal as the preinstalled information signal for the DIAC decoding circuit 300 to extract the preinstalled information.

The disclosed recordable optical recording medium containing preinstalled information along with the method and circuit of reading the preinstalled information have the feature that the preinstalled information can be rapidly and accurately extracted without occupying much of the recording space of the medium.

Certain variations would be apparent to those skilled in the art, which variations are considered within the spirit and scope of the claimed invention.

What is claimed is:

1. A method for reading preinstalled information in a recordable optical recording medium for reading the preinstalled information from the recordable optical recording medium that contains preinstalled information, the recordable optical recording medium containing a substrate engraved with a spiral pregroove for providing a tracking servo signal, the track of the pregroove being a slightly wobbled spiral curve, the method comprising the steps of:

extracting a wobble signal from the tracking servo signal, removing signals in non-wobble bands with the wobble containing a plurality of first waveforms, second waveforms, and third waveforms with same fundamental cycles, the duty cycles of the first waveform, the second waveform and the third waveform being all distinct, with that of the first waveform being 1;

outputting a clock generating signal according to the wobble signal;

making a 90-degree phase shift on the clock generating signal to produce a phase corrected signal;

integrating the wobble signal and performing resets according to the rising and lowering edges of the phase corrected signal to output an integrated and reset wobble signal; and cutting the integrated and reset wobble signal into a preinstalled information signal.

2. The method of claim 1, wherein the clock generating signal is used to generate a write clock.

3. The method of claim 1, wherein the preinstalled information decoded from the preinstalled information signal contains disk information and addressing codes (DIAC).

4. A circuit for reading preinstalled information in a recordable optical recording medium for reading the preinstalled information from the recordable optical recording medium that contains preinstalled information, the recordable optical recording medium containing a substrate engraved with a spiral pregroove for providing a tracking servo signal, the track of the pregroove being a slightly wobbled spiral curve, the circuit comprising:

a band-pass filter, which receives a tracking servo signal and outputs a wobble signal, removing signals in non-wobble bands with the wobble containing a plurality of first waveforms, second waveforms, and third waveforms with same fundamental cycles, the duty cycles of the first waveform, the second waveform and the third waveform being all distinct, with that of the first waveform being 1;

a phase-lock loop, which outputs a clock generating signal according to the wobble signal;

a phase corrector, which obtains the clock generating signal and makes a 90-degree phase shift to generate a phase corrected signal;

an integration and reset circuit, which integrates the wobble signal and resets the wobble signal according to the rising and lower edges of the phase corrected signal, outputting an integrated and reset wobble signal; and a division circuit, which cuts the integrated and reset wobble into a preinstalled information signal.

5. The circuit of claim 4, wherein the clock generating signal is used to generate a write clock.

6. The circuit of claim 4, wherein the preinstalled information decoded from the preinstalled information signal contains disk information and addressing codes (DIAC).

* * * * *